United States Patent
Shin et al.

(10) Patent No.: US 6,553,069 B1
(45) Date of Patent: Apr. 22, 2003

(54) DIGITAL IMAGE SEGMENTING METHOD AND DEVICE

(75) Inventors: Hyun-doo Shin, Kyungki-do (KR); Yang-lim Choi, Kyungki-do (KR); B. S. Manjunath, Santa Barbara, CA (US); Yining Deng, Santa Barbara, CA (US)

(73) Assignees: Samsung Electronics Co., Ltd., Kyungki-do (KR); Regents of the University of California, Oakland, CA (US)

( * ) Notice: Subject to any disclaimer, the term of this patent is extended or adjusted under 35 U.S.C. 154(b) by 0 days.

(21) Appl. No.: 09/334,632

(22) Filed: Jun. 17, 1999

(51) Int. Cl.[7] .......................... H04N 7/12; H04N 11/02; H04N 11/04

(52) U.S. Cl. ...................... 375/240.14; 375/240.12; 375/240.15

(58) Field of Search ................ 375/240.14, 240.12, 375/240.15; 348/390, 413; 345/328; 382/236

(56) References Cited

U.S. PATENT DOCUMENTS 5,592,226 A * 1/1997 Lee ........................... 348/413
6,173,077 B1 * 1/2001 Trew ......................... 382/236
6,272,180 B1 * 8/2001 Lei .......................... 375/240.16
6,285,361 B1 * 9/2001 Brewer et al. .............. 345/328
6,295,089 B1 * 9/2001 Hoang ....................... 348/390
6,324,216 B1 * 11/2001 Igarashi et al. ............ 375/240.14

* cited by examiner

Primary Examiner—Chris Kelley
Assistant Examiner—Charles Parsons
(74) Attorney, Agent, or Firm—Sughrue Mion, PLLC

(57) ABSTRACT

A digital image segmentation method and device is provided. The method includes the steps of grouping an image stream into a plurality of continuous frame groups, setting one arbitrary frame as an I frame and the others as P frames in each group, segmenting the I frame into a plurality of regions, and segmenting the P frames by obtaining motion vectors, using motion prediction, of the segmented I frame regions, respectively, with respect to each of the P frames, by moving the segmented I frame regions by the respective motion vectors, and by setting the moved I frame regions as segmented P frame regions. Accordingly, the segmentation of the I frame is applied to the P frame segmentation, and a conventional segmentation process consuming excessive time with respect to all frames does not need to be performed. Thus, rapid segmentation can be performed.

9 Claims, 3 Drawing Sheets

DIGITAL IMAGE SEGMENTING METHOD AND DEVICE

BACKGROUND OF THE INVENTION

1. Field of the Invention

The present invention relates to an image segmenting method, and more particularly, to a digital image segmentation method of segmenting a digital image into objects for object-based image processing. Also, the present invention relates to a method of tracking an area in an image segmented by the above-described method, and to a digital image segmenting device to accomplish the image segmenting method.

2. Description of the Related Art

Image segmentation is essential for object-based digital image processing. However, an image segmentation method, which provides satisfactory results in real time, has not been developed.

SUMMARY OF THE INVENTION

To solve the above problem, it is an object of the present invention to provide a digital image segmenting method for segmenting a digital image into objects at high speed for object-based image processing.

It is another object of the present invention to provide a method of tracking an area of an image segmented by the above-described method at high speed.

It is still another object of the present invention to provide a digital image segmenting device for accomplishing the image segmenting method.

Accordingly, to achieve the first object of the invention, there is provided a digital image segmenting method comprising: (a) grouping an image data stream into a plurality of continuous frame groups; (b) setting one arbitrary frame as an I frame and the others as P frames in each group; (c) segmenting the I frame into a plurality of regions; and (d) segmenting the P frames, by obtaining a motion vector using motion prediction for each of the segmented I frame regions with respect to every one of the P frames, by moving the segmented I frame regions by the motion vectors, respectively, and by setting the moved I frame regions as segmented P frame regions within each P frame.

It is preferable that step (d) comprises: performing an affine matching method of moving each of the segmented I frame regions with respect to every one of the P frames by a predetermined displacement and setting P frame regions, each having a minimum difference from the respective segmented I frame regions, as affine matching regions, respectively; obtaining a motion vector for each of the segmented I frame regions which represents the displacement of the P frame affine matching region with respect to the corresponding segmented I frame region; and moving the segmented I frame regions by the motion vectors, respectively, with respect to every P frame, and setting the moved segmented I frame regions as segmented P frame regions, respectively.

Preferably, the digital image segmenting method, after step (d), further comprises: (e) determining whether the processed segmented I frame region is the last region; and (f) returning to step (d) if it is determined in step (e) that the segmented I frame region is not the last region, wherein the P frames are sequentially segmented based on the segmentation of the I frame.

To achieve the second object of the invention, there is provided a method of tracking regions in an image segmented by the digital image segmenting method, the tracking method comprising: tracking the I frame regions using an affine motion compensation method of moving one I frame region in one frame group with respect to an I frame in another frame group by a predetermined displacement, and setting an I frame region in the other frame group having a minimum difference from the first I frame region as an affine matched region; and tracking the P frame regions formed by segmenting the P frames using motion prediction on the I frames in groups.

To achieve the third object of the invention, there is provided a digital image segmenting device comprising: a grouping unit for grouping an image data stream into a plurality of continuous frame groups and setting one arbitrary frame in each group as an I frame and the others as P frames; an I frame segmenting unit for segmenting the received I frame and outputting the segmented I frame and sequentially outputting the segmented I frame regions; an affine matching unit for obtaining a motion vector using motion prediction for each of the received segmented I frame regions with respect to every P frame; and a P frame segmenting unit for receiving the P frames and the motion vectors and segmenting each of the P frames by moving the segmented I frame regions by the motion vectors, respectively, in each of the P frames.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

Figure 1:
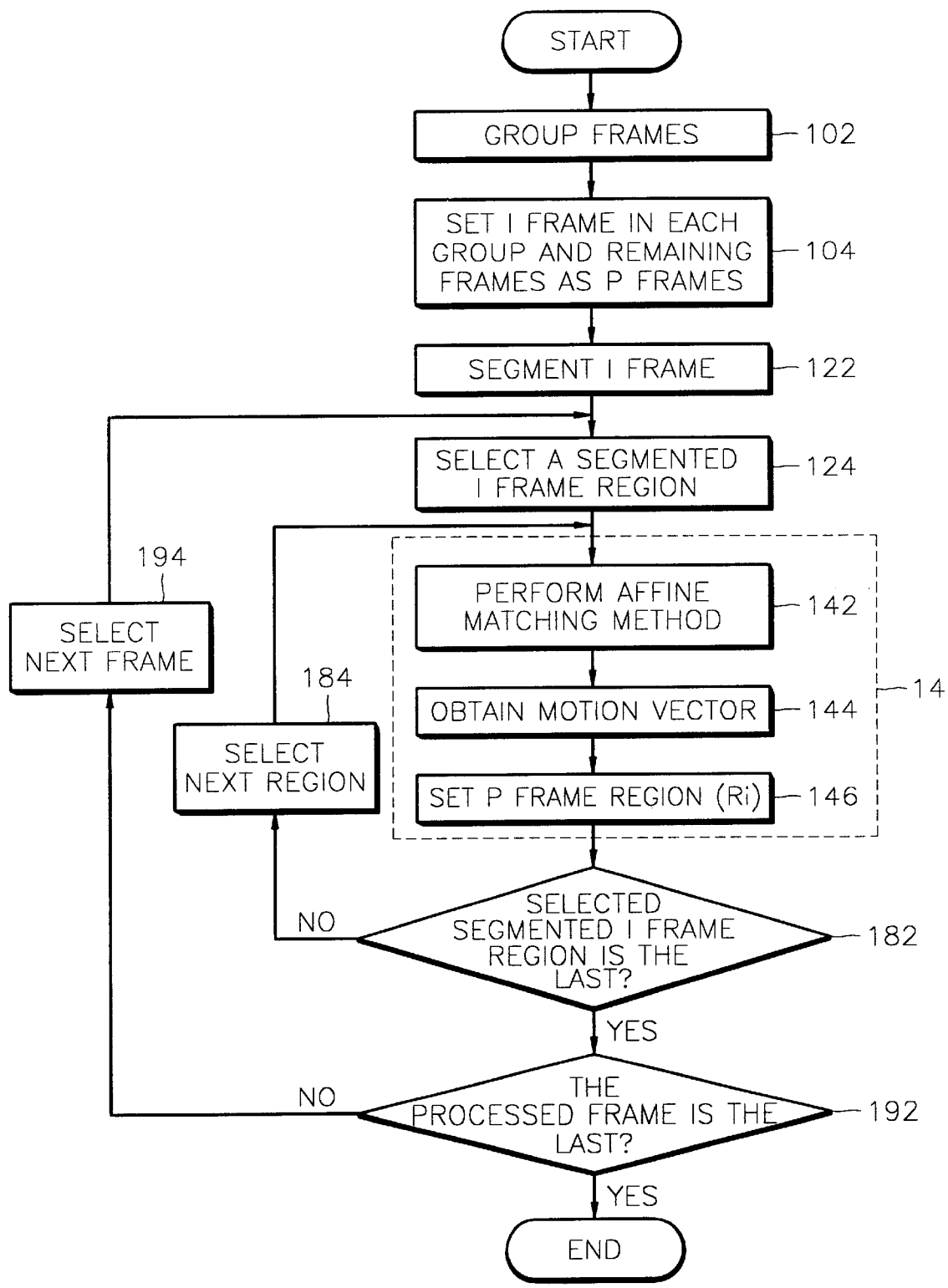
FIG. 1 is a flowchart illustrating the essential steps of a digital image segmenting method according to the present invention.
Figure 2:
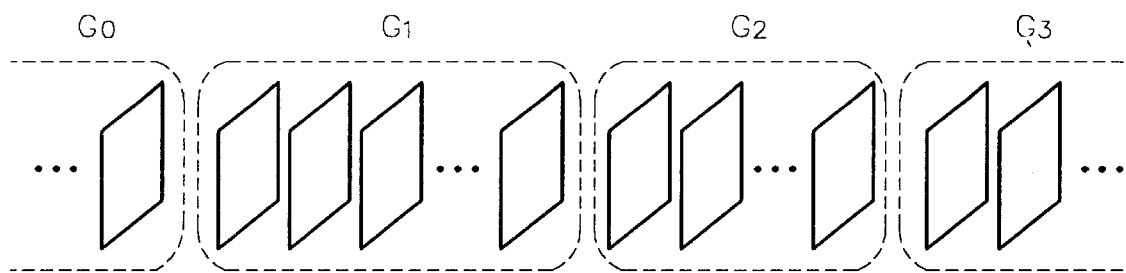
FIG. 2 is a view illustrating a frame grouping step in a digital image segmenting method according to the present invention.

Referring to FIG. 1, in a digital image segmenting method according to the present invention, first, an image data stream is grouped into a plurality of continuous frame groups, in step 102. FIG. 2 is a view for explaining the frame grouping step in the digital image segmenting method according to the present invention. That is, in the grouping step 102, a plurality of frames are grouped into a plurality of continuous frame groups, thus forming first, second, third, and fourth groups $G_0$, $G_1$, $G_2$, and $G_3$. In the case of MPEG coding, 13 frames can be formed in a group of, for example, "I B B P B B P B B P B B I".

One arbitrary frame in each of the groups is set as an I frame, and the remainder are set as P frames, in step 104.

Figure 3:
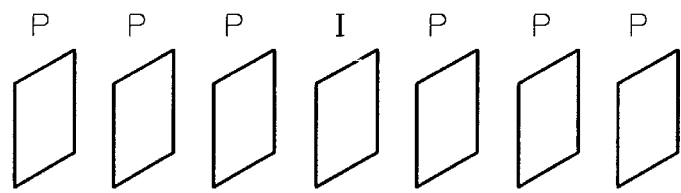
FIG. 3 is a view illustrating an I frame setting step in a digital image segmenting method according to the present invention.

FIG. 3 shows an example of a group in which an I frame and P frames are set in step 104. The I frame can be set arbitrarily, as an intra-frame, determined with reference to the management information on a digital image frame as in an MPEG-2 standard. The other frames not set as the I frame in each of the groups are set as P frames.

The I frame is segmented into a plurality of regions in step 122. Various segmentation methods known to those skilled in the art can be used in the segmenting step 122.

A region is selected from the segmented I frame regions in step 124. A motion vector is extracted by motion prediction of the selected region with respect to a P frame, and the selected region is moved by the motion vector and set as a segmented P frame region, thereby segmenting the P frame, in step 14.

The P frame segmenting step 14 is comprised of three substeps. In the first step 142, affine matching is performed in which the selected I frame region is moved a predetermined displacement with respect to the P frame, and a P frame region having a least difference from the selected I frame region is set as an affine matching region. In the second step 144, a motion vector is obtained, which represents the displacement of the affine matching P frame region with respect to the selected I frame region. In the third step 146, a P frame region is determined by moving the segmented I frame region by the motion vector in the P frame.

Figure 4:
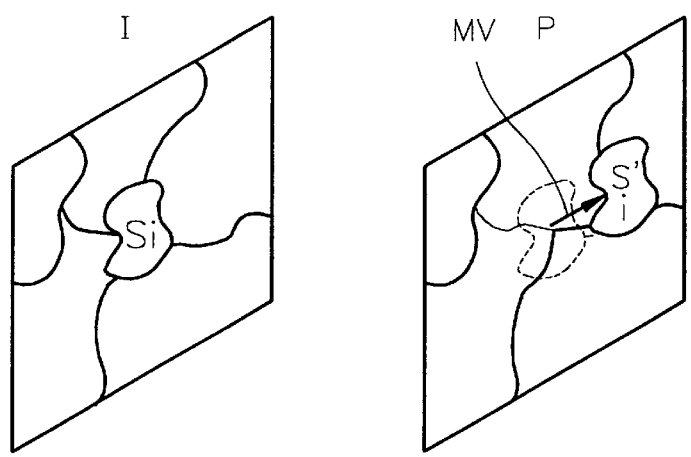
FIG. 4 is a view illustrating a process for segmenting a P frame using one region of an I frame segmented by a digital image segmenting method according to the present invention.

FIG. 4 is a view illustrating a process for segmenting the P frame using one region of an I frame segmented by a digital image segmenting method according to the present invention. The process for segmenting the P frame will now be described in detail referring to FIG. 4. First, a region Si is set among the segmented I frame regions. Another region Si', which is displaced by a certain displacement from the region Si and corresponds to the region Si, is defined, and the difference between the regions Si' and Si is then calculated. Here, the difference calculation can be performed by different methods according to whether it is a black and white image or a color image. In the case of a black and white image, for example, a difference in luminance can be calculated. In the case of a color image, for example, differences in luminance and chromaticity can be calculated. As an example, such a calculation is performed with respect to all coordinates, and the results of the calculation are summed. More particularly, the given I frame region Si is moved by a predetermined displacement, and a P frame region Si' having a minimum difference from the set I frame region is set as an affine matching region. The direction and distance between the region Si and the region Si', having a minimum difference from the region Si, is defined as a motion vector MV. The I frame segmented region is moved by the motion vector MV and set as the segmented P frame region Si'. Such a process is motion prediction of the I frame regions on the P frame, and can be understood as being similar to MPEG-2 motion prediction.

According to the present embodiment, after the P frame segmentation step 14, it is determined whether the segmented I frame region is the last region, in step 182. If it is determined in step 182 that the segmented I frame region is not the last, the next region is selected in step 184, and the procedure returns to the P frame segmentation step 14. Thus, P frames are sequentially segmented with respect to all segmented I frame regions. In this way, I frame segmentation is applied to the P frame segmentation, and a conventional time-consuming segmentation process does not need to be performed with respect to every frame.

Figure 5:
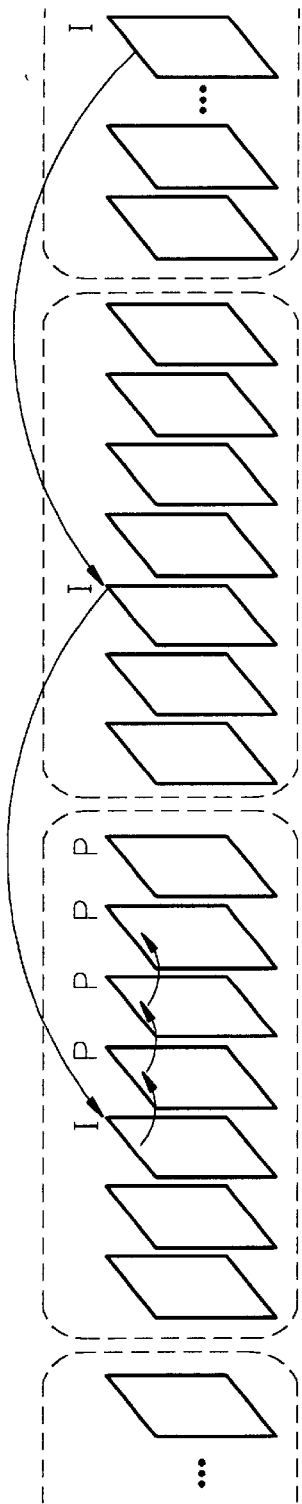
FIG. 5 is a view illustrating a process for tracking a region in groups of images segmented by a digital image segmenting method according to the resent invention.

The groups of images segmented by the above-described method can be rapidly region-tracked by a region tracking method of a segmented digital image according to the present invention. FIG. 5 illustrates a process for tracking regions using a region tracking method according to the present invention. According to an embodiment of the region tracking method of the present invention, region tracking with respect to the I frame is performed by affine motion compensation in which one segmented I frame region is moved by a predetermined displacement with respect to another I frame between frame groups of an image segmented by the above method, thus setting a region having a minimum difference from the original region as an affine matching region. It is preferable that texture and size characteristics are used together to prevent misselecting of a region. Region tracking in each group has already been accomplished by a space segmentation process. Thus, in each group, it is possible to perform motion prediction for the I frame, so that tracking of segmented P frame regions can be accomplished. In the region tracking method according to the present invention as described above, tracking is performed not on all regions but on each object, so that easy and fast region tracking can be accomplished.

The digital image segmenting method and the segmented digital image region tracking method according to the present invention can be written as programs which can be executed in a computer. Also, these methods can be realized in a general purpose digital computer which runs the programs read from a medium which is used in computers. The medium can be a magnetic recording medium such as a floppy disk or a hard disk, an optical recording medium such as a CD-ROM or a DVD, or a medium such as a carrier wave used for transmission via Internet. Also, these functional programs, codes, and code segments can be easily inferred by programmers skilled in the technical field of the present invention.

The image segmenting method according to the present invention can also be accomplished as a device. The device can be used as an image search device for compiling images, in a digital image processing device such as a digital camera or a digital camcorder.

Figure 6:
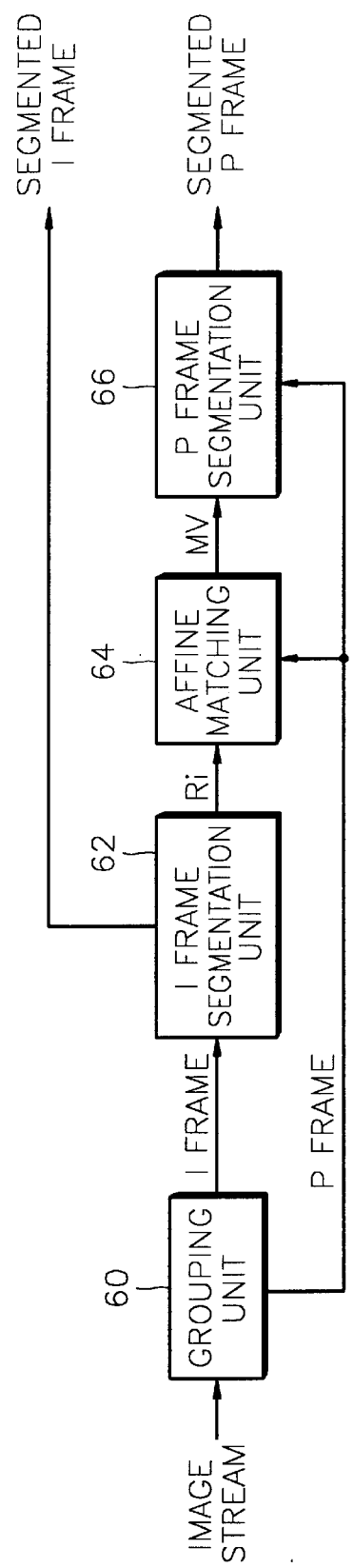
FIG. 6 is a block diagram showing the structure of a digital image segmenting device according to the present invention.

FIG. 6 is a block diagram showing the structure of a digital image segmenting device according to the present invention. Referring to FIG. 6, the image segmenting device according to the present invention includes a grouping unit 60, an I frame segmentation unit 62, an affine matching unit 64, and a P frame segmenting unit 66.

The grouping unit 60 receives an image stream, groups the image stream into a plurality of continuous frame groups, and sets an arbitrary frame as an I frame and the remainder as P frames in each of the groups. The I frame segmenting unit 62 receives the I frame, segments the I frame into a plurality of regions, and sequentially outputs segmented I frame regions (Ri). The affine matching unit 64 receives the I frame region (Ri) and a P frame, and outputs a motion vector MV by performing motion prediction according to an affine matching method. In the affine matching method, one segmented I frame region is moved with respect to the P frame by a predetermined displacement, and a P region on the P frame having a minimum difference from the segmented I frame region is set as an affine matching region, as described above referring to FIG. 4. The direction and distance between the segmented I frame region and the affine matching region in the P frame is defined as a motion vector. The P frame segmenting unit 66 receives the P frame and the motion vector, moves the segmented I frame region by a distance corresponding to the motion vector MV, and sets the moved segmented I frame region as a segmented P frame region. The P frame is segmented in this manner for each of the segmented I frame regions. This process is performed for all of the P frames in a P frame group to segment the P frames.

In the digital image segmenting method and device according to the present invention as described above, the segmentation of the I frame is applied to the P frame segmentation, and a conventional segmentation process with respect to all frames consuming excessive time does not need to be performed. Thus, rapid segmentation can be performed.

Also, in the segmented digital image region tracking method according to the present invention, tracking is performed not on every region but on each object. Thus, easy and rapid tracking of regions is possible.

Although the invention has been described with reference to a particular embodiment, it will be apparent to one of ordinary skilled in the art that modifications of the described embodiment may be made without departing from the spirit and scope of the invention.

What is claimed is:

1. A digital image segmentation method, comprising:

grouping an image data stream into a plurality of frame groups;

setting, in each of said frame groups, one arbitrary frame as an I frame and the other frames as P frames;

segmenting said I frame into a plurality of regions;

obtaining a motion vector for each of said plurality of regions of said I frame with respect to one of said P frames in a corresponding frame group;

segmenting said one of said P frames by moving each of said plurality of regions of said I frame by a corresponding motion vector in said I frame, and setting each moved I frame region as a segmented P frame region in said one of said P frames; and repeating said obtaining step and said segmenting step for remaining ones of said P frames in said corresponding frame group.

2. The method as claimed in claim 1, wherein said motion vector obtaining step comprises performing a motion prediction operation of each of said plurality of regions of said I frame with respect to said one of said P frames.

3. The method according to claim 1, further comprising:

repeating said obtaining step, said segmenting step and said repeating step for each of said P frames in said corresponding frame group.

4. The method as claimed in claim 1, wherein said obtaining step comprises:

performing an affine matching operation for each of said plurality of regions of said I frame with respect to said one of said P frames, said performing step comprising:

moving each of said plurality of regions of said I frame with respect to said one of said P frames by a predetermined displacement;

determining P frame regions in said one of said P frames having a minimum difference from said plurality of regions of said I frame, respectively;

setting said P frame regions determined in said determining step as affine matching regions, respectively; and obtaining motion vectors representing the displacement of said affine matching regions with respect to corresponding ones of said plurality of regions of said I frame.

5. The method as claimed in claim 4, wherein said segmenting step comprises:

moving each of said plurality of regions of said I frame by a corresponding motion vector with respect to said one of said P frames; and setting a moved I frame region as a segmented P frame region.

6. The digital image segmentation method as claimed in claim 1, further comprising:

determining whether a said P frames have been segmented by all of said plurality of regions of a corresponding I frame; and repeating said obtaining, segmenting and repeating steps when it is determined that said P frames have not been segmented by all of said plurality of regions of said I frame;

wherein said P frames are sequentially segmented based upon said plurality of regions of said I frame.

7. A method of tracking regions in an image segmented by a digital image segmenting method, which comprises grouping an image data stream into a plurality of frame groups, setting, in each of said frame groups, one arbitrary frame as an I frame and the other frames as P frames, segmenting said I frame into a plurality of regions, obtaining a motion vector for each of said plurality of regions of said I frame with respect to one of said P frames in a corresponding frame group, segmenting said one of said P frames by moving each of said plurality of regions of said I frame by a corresponding motion vector in said I frame, and setting each moved I frame region as a segmented P frame region in said one of said P frames, and repeating said obtaining step and said segmenting step for remaining ones of said P frames in said corresponding frame group, said tracking method comprising:

tracking said plurality of regions of said I frame using an affine motion compensation method of moving one of said plurality of regions of said I frame in one of said plurality of frame groups with respect to an I frame in another one of said plurality of frame groups by a predetermined displacement, determining a region of said I frame in said another one of said plurality of frame groups which has a minimum difference from said one of said plurality of regions of said I frame in said one of said plurality of frame groups, and setting said region as an affine matching region in said another one of said plurality of frame groups; and tracking a segmented P frame region corresponding to said one of said plurality of regions of said I frame based upon said affine matching region.

8. A digital image segmentation device, comprising:

a grouping unit which groups an image data stream into a plurality of frame groups and which sets, in each of said frame groups, one arbitrary frame as an I frame and the other frames as P frames;

an I frame segmenting unit which receives and segments said I frame into a plurality of regions, and outputs segmented I frame regions;

an affine matching unit which receives said segmented I frame regions and said P frames in a corresponding frame group, and which determines a motion vector for each of said segmented I frame regions with respect to each one of said P frames; and a P frame segmenting unit which receives each one of said P frames and said motion vector for each of said segmented I frame regions, and segments each one of said P frames by moving said segmented I frame regions by a corresponding motion vector and setting each moved I frame region as a segmented P frame region in each one of said P frames.

9. A digital image segmentation device, comprising:

means for grouping an image data stream into a plurality of frame groups and seting, in each of said frame groups, one arbitrary frame as an I frame and the other frames as P frames;

means for receiving and segmenting said I frame into a plurality of regions, and outputting segmented I frame regions;

means for receiving said segmented I frame regions and said P frames in a corresponding frame group, and determining a motion vector for each of said segmented I frame regions with respect to each one of said P frames; and means for receiving each one of said P frames and said motion vector or each of said segmented I frame regions, and segmenting each one of said P frames by moving said segmented I frame regions by a corresponding motion vector and setting each moved I frame region as a segmented P frame region in each one of said P frames.

* * * * *